Jan. 3, 1939.  W. ZENZ  2,142,296
HYDRAULIC STEADYING DEVICE, ESPECIALLY FOR MOTOR VEHICLES
Filed June 15, 1937
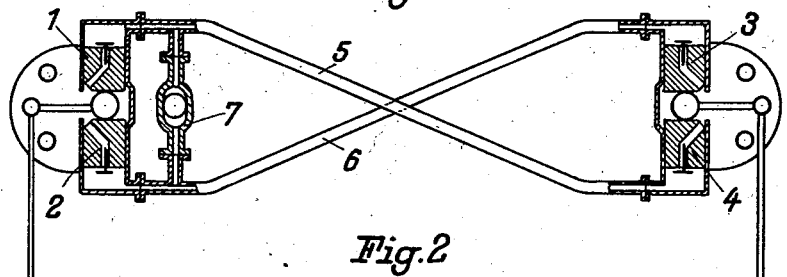
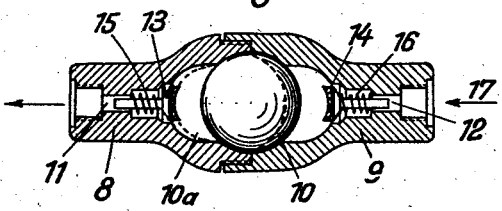
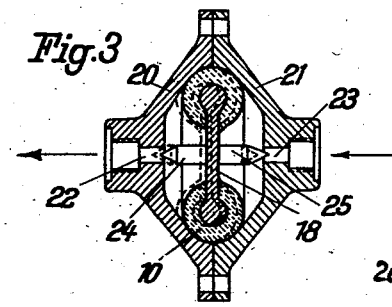
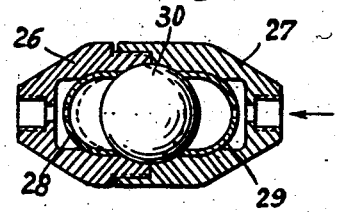
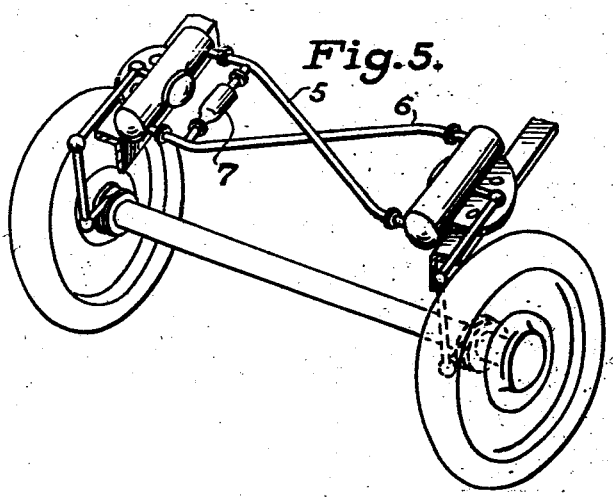
Inventor.

Patented Jan. 3, 1939

2,142,296

UNITED STATES PATENT OFFICE 2,142,296

HYDRAULIC STEADYING DEVICE, ESPECIALLY FOR MOTOR VEHICLES

Wilhelm Zenz, Coblenz-Neuendorf, Germany, assignor of one-half to Oscar Cupper, Coblenz, Germany Application June 15, 1937, Serial No. 148,349
In Germany October 29, 1936

9 Claims. (Cl. 267—11)

This invention relates to a hydraulic steadying device, especially for motor vehicles.

It has become known, to connect by conduits, generally intersecting the one the other, the double-acting hydraulic shock absorbers arranged on the two sides of the vehicle, and to arrange between these conduits a compensating cylinder with pistons. In these compensating devices the piston is either carried by feeble springs serving merely to maintain the piston in a medium position when it is inoperative, or the springs carrying the piston are so strong, that they exert a certain influence upon the whole plant. Springs possess, however, in this instance, the inconvenience that their spring power alters in linear direction and that their production and dimensioning causes certain difficulties in consideration of the small dimensions of the steadying device.

This invention relates to a compensating device, the springing characteristic of which can extend according to any desired curve and which can be easily made even in the smallest dimensions, requires no adjusting, works accurately, requires neither springs nor piston packings and which is much cheaper to produce.

According to the invention the piston of the compensating device consists of an elastic body which, in the inoperative position, is situated in a widening of the housing and is forced by hydraulic pressure towards the one or other side into a narrower portion of said housing.

The piston may be constructed in different manners, for instance as rotary body (sphere, ellipsoid) or as disc with elastic rim, the spring characteristic being determined thereby. To further increase the elasticity of the piston it may be constructed as a closed hollow body inflated by air.

In order that, at very high pressures, the piston cannot be pressed into the connecting conduits or too strongly deformed, a shutting-off device is provided in the compensating device upon which the piston can act. Exchangeable cup-shaped inserts are preferably inserted into the cylinders in order to determine the desired deformation of the elastic piston by the form of said inserts.

Three embodiments of the invention are illustrated by way of example in the accompanying drawing, in which in Fig. 1 the total plant is shown.
Fig. 2 shows the first,
Fig. 3 the second and
Fig. 4 the third embodiment of the invention.
Fig. 5 is a perspective view of a pair of wheels and axles fitted with hydraulic steadying device.

1, 2 and 3, 4 designate in Fig. 1 the pairs of cylinders arranged on the two sides of the vehicle and connected respectively by conduits 5 and 6 arranged crosswise. A compensating device 7 is arranged between the two conduits.

This compensating device consists, according to Fig. 2, of a cylindrical housing formed by two halves 8 and 9 adapted to be screwed the one on the other. The internal space of the housing 8, 9 is spherically enlarged at the middle, and at this point a piston 10 in the form of a sphere is located. Valves 13 and 14 are arranged in the admission ports 11 and 12 and normally held in the open position by springs 15 and 16. If the hydraulic pressure acting in the direction of the arrow 17 flows through the admission port 12 into the cylinder, the piston 10 is shifted to the left and assumes the shape 10a indicated in dotted lines. The piston then presses the valve 13 into its closing position.

In the embodiment of the invention shown in Fig. 3 the piston consists of a disc 18 more or less rigid, the rim of which is covered with an elastic bead 19. The housing of the compensating device has the shape of a double cone 20, 21, truncated on both sides, with admission ports 22, 23 for the liquid, said ports adapted to be shut off by pins 24, 25, fixed on the disc 18. The shutting off takes place as soon as the disc has carried out a travel determined by the length of the pins.

According to Fig. 4 cup-shaped inserts 28, 29 are located in the cylinders 26, 27 of the compensating device, the desired deformation of the elastic piston 30 being determined by the shape of these inserts. The body is here shown as a hollow sphere which is filled with a suitable fluid, or inflated.

I claim:—

1. In a hydraulic stabilizer for vehicles, an axle forming part of the vehicle, a pair of pistons operatively connected to one end, and a pair of pistons operatively connected to the other end of the axle, a cylinder for each piston adapted to receive a liquid, pipes connecting one cylinder in each pair at one end of the axle to the oppositely arranged cylinder at the other end of the axle, a housing defining an extension, a body of elastic material secured in the extension, a pipe extending from one end of the housing to one of the connecting pipes, and a pipe extending from the other end of the housing to the other connecting pipe.

2. In a hydraulic stabilizer for vehicles, an axle forming part of the vehicle, a pair of pistons operatively connected to one end, and a pair of pistons operatively connected to the other end of the axle, a cylinder for each piston adapted to receive a liquid, pipes connecting one cylinder in each pair at one end of the axle to the oppositely arranged cylinder at the other end of the axle, a housing defining an extension, a body in the shape of a revolution body made of elastic material secured in the extension, a pipe extending from one end of the housing to one of the connecting pipes, and a pipe extending from the other end of the housing to the other connecting pipe.

3. In a hydraulic stabilizer for vehicles, an axle forming part of the vehicle, a pair of pistons operatively connected to one end, and a pair of pistons operatively connected to the other end of the axle, a cylinder for each piston adapted to receive a liquid, pipes connecting one cylinder in each pair at one end of the axle to the oppositely arranged cylinder at the other end of the axle, a housing defining an extension, a spherical body of elastic material secured in the extension, a pipe extending from one end of the housing to one of the connecting pipes, and a pipe extending from the other end of the housing to the other connecting pipe.

4. In a hydraulic stabilizer for vehicles, an axle forming part of the vehicle, a pair of pistons operatively connected to one end, and a pair of pistons operatively connected to the other end of the axle, a cylinder for each piston adapted to receive a liquid, pipes connecting one cylinder in each pair at one end of the axle to the oppositely arranged cylinder at the other end of the axle, a housing defining an extension, a substantially spherical body of elastic material secured in the extension, a pipe extending from one end of the housing to one of the connecting pipes, and a pipe extending from the other end of the housing to the other connecting pipe.

5. In a hydraulic stabilizer for vehicles, an axle forming part of the vehicle, a pair of pistons operatively connected to one end, and a pair of pistons operatively connected to the other end of the axle, a cylinder for each piston adapted to receive a liquid, pipes connecting one cylinder in each pair at one end of the axle to the oppositely arranged cylinder at the other end of the axle, a housing defining an extension, an annular body of elastic material secured in the extension, a comparatively rigid disc inserted in the annular body, a pipe extending from one end of the housing to one of the connecting pipes, and a pipe extending from the other end of the housing to the other connecting pipe.

6. In a hydraulic stabilizer for vehicles, an axle forming part of the vehicle, a pair of pistons operatively connected to one end, and a pair of pistons operatively connected to the other end of the axle, a cylinder for each piston adapted to receive a liquid, pipes connecting one cylinder in each pair at one end of the axle to the oppositely arranged cylinder at the other end of the axle, a housing defining an extension, a hollow, fluid-filled body of elastic material secured in the extension, a pipe extending from one end of the housing to one of the connecting pipes, and a pipe extending from the other end of the housing to the other connecting pipe.

7. In a hydraulic stabilizer for vehicles, an axle forming part of the vehicle, a pair of pistons operatively connected to one end, and a pair of pistons operatively connected to the other end of the axle, a cylinder for each piston adapted to receive a liquid, pipes connecting one cylinder in each pair at one end of the axle to the oppositely arranged cylinder at the other end of the axle, a housing defining an extension, a body of elastic material secured in the extension, cup-shaped members arranged at opposite sides of the extension for the reception of the elastic body, a pipe extending from one end of the housing to one of the connecting pipes, and a pipe extending from the other end of the housing to the other connecting pipe.

8. In a hydraulic stabilizer for vehicles, an axle forming part of the vehicle, a pair of pistons operatively connected to one end, and a pair of pistons operatively connected to the other end of the axle, a cylinder for each piston adapted to receive a liquid, pipes connecting one cylinder in each pair at one end of the axle to the oppositely arranged cylinder at the other end of the axle, a housing defining an extension, a body of elastic material secured in the extension, exchangeable cup-shaped members arranged at opposite sides of the extension for the reception of the elastic body, a pipe extending from one end of the housing to one of the connecting pipes, and a pipe extending from the other end of the housing to the other connecting pipe.

9. In a hydraulic stabilizer for vehicles, an axle forming part of the vehicle, a pair of pistons operatively connected to one end, and a pair of pistons operatively connected to the other end of the axle, a cylinder for each piston adapted to receive a liquid, pipes connecting one cylinder in each pair at one end of the axle to the oppositely arranged cylinder at the other end of the axle, a housing defining an extension, a body of elastic material secured in the extension, a pipe extending from one end of the housing to one of the connecting pipes, a pipe extending from the other end of the housing to the other connecting pipe, and check valves arranged at the openings of the pipes in the housing and operatively connected to the body.

WILHELM ZENZ.